United States Patent [19]

Maddalena

[11] Patent Number: 5,013,440

[45] Date of Patent: May 7, 1991

[54] FLUSHING LIQUOR DECANTER DRAG MODIFICATION

[75] Inventor: Frederick L. Maddalena, Rostraver Township, Westmoreland County, Pa.

[73] Assignee: USX Corporation, Pittsburgh, Pa.

[21] Appl. No.: 431,820

[22] Filed: Nov. 6, 1989

[51] Int. Cl.$^5$ .............................. B01D 17/025
[52] U.S. Cl. ................................... 210/526
[58] Field of Search .................. 210/400, 526

[56] References Cited

U.S. PATENT DOCUMENTS

| | | | |
|---|---|---|---|
| 366,026 | 7/1887 | Peters | 210/400 X |
| 1,769,655 | 7/1930 | Stehling | 210/526 |
| 2,254,176 | 8/1941 | Fischer | 210/526 |
| 3,891,558 | 6/1975 | Condit, Jr. | 210/526 |
| 3,923,659 | 12/1975 | Ullrich | 210/179 |
| 4,176,062 | 11/1979 | Husher et al. | 210/72 |
| 4,282,096 | 8/1981 | Burkert | 210/182 |
| 4,302,331 | 11/1981 | Condit, Jr. | 210/160 |
| 4,645,598 | 2/1987 | Hannum | 210/526 X |

*Primary Examiner*—Charles Hart
*Attorney, Agent, or Firm*—W. F. Riesmeyer, III

[57] ABSTRACT

An improvement in apparatus for removing solids from coke oven tar in a flushing liquor decanter. The improvement comprises at least one screen member in the form of a planar metal plate on an endless travel device for passing through tar in the decanter. The screen member serves to remove floating agglomerates from the tar and permit uniform outflow of tar exiting the decanter.

6 Claims, 3 Drawing Sheets

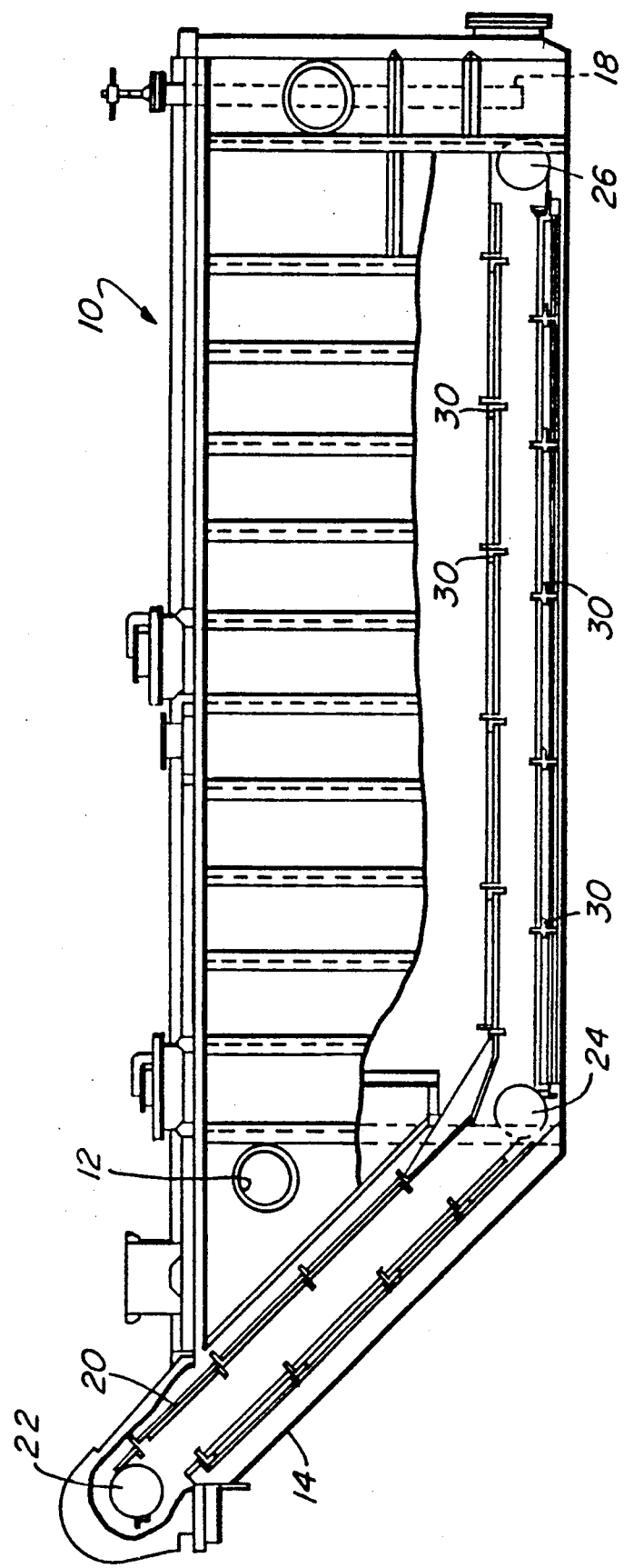

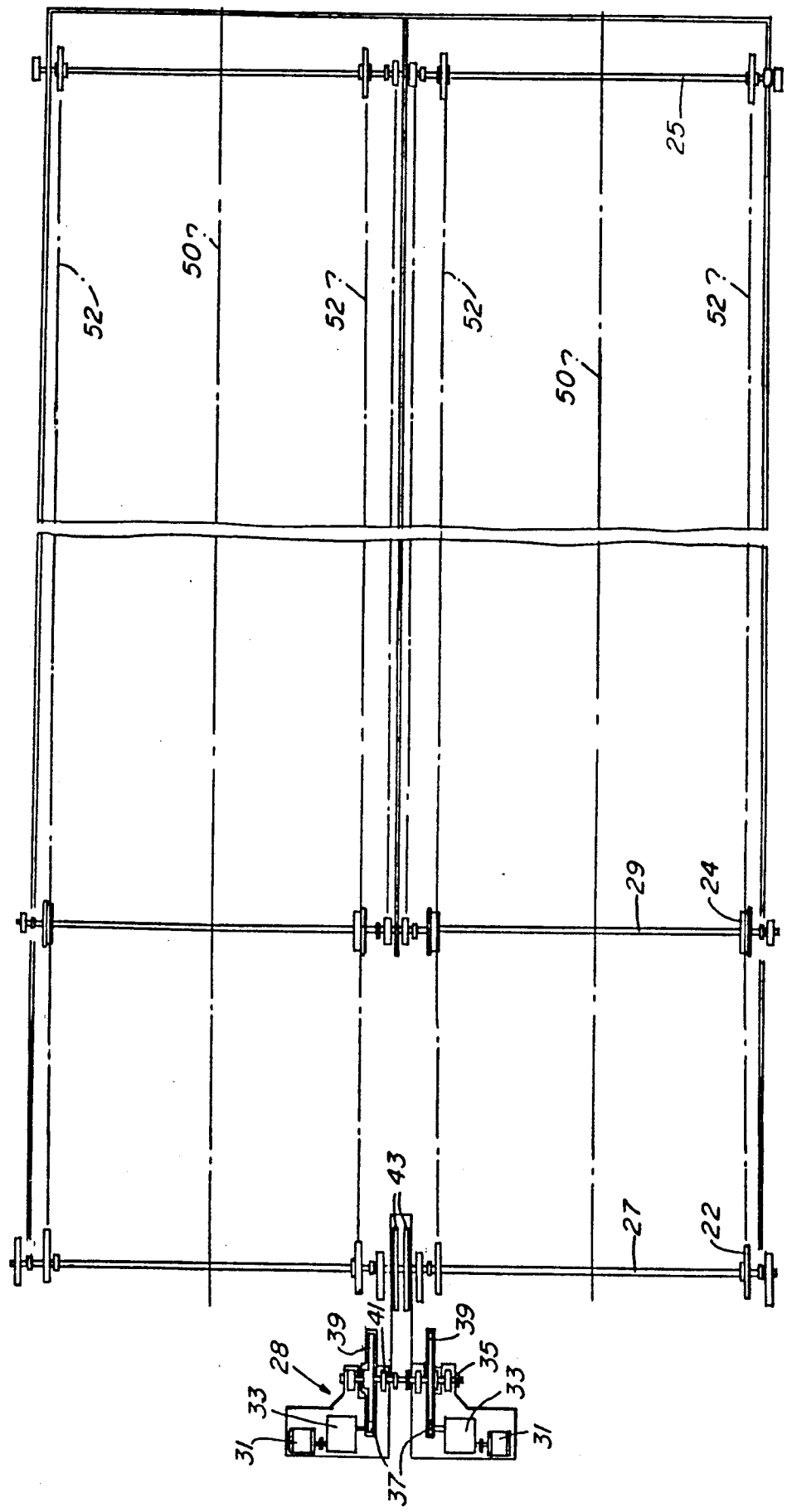

FLUSHING LIQUOR DECANTER DRAG MODIFICATION

BACKGROUND OF THE INVENTION

This invention relates to apparatus for removing solids for coke oven tar in a flushing liquor separation decanter, and particularly to a drag assembly having endless travel means with screen member elements thereon.

"Flushing liquor decanters" are well known devices used for separating tar from flushing liquor in coke plants. Such devices are shown for example in U.S. Pat. Nos. 3,923,659 and 4,282,096. The separation process is described in U.S. Pat. No. 4,176,062. The decanters are rather large vessels, for example, of generally rectangular shape. A typical decanter might be 50 feet long, 14 feet wide and 10 feet high. Such a decanter would be designed to receive 2,000 to 5,000 gallons per minute of flushing liquor and to recover 2 to 15 gallons per minute of tar from the liquor. Flushing liquor and tar are desirably passed from the decanter at the same rates, respectively as that which they enter. Exit flow of tar from the decanter is controlled by a simple weir. The conventional decanter includes a continuous drag system for removing solids which settle with the tar to the bottom of the decanter.

With the advent of the use of pulverized coal in coke oven practice, significant quantities of coal and coke particles enter with the flushing liquor. The large coal and coke particles settle to the bottom of the decanter and are removed by the conventional drag system. The smaller particles combine and agglomerate with tar and moisture to form "goobers" which float within the tar. These agglomerates eventually build up and plug the weir reducing and sometimes stopping the outlet flow of tar. The resultant increase or building of the tar level must be reduced. The necessary reduction of tar level detracts from tar quality, especially causing variation and elevation in the moisture level and quinoline insoluable ("QI") content of the tar.

A chain conveyor having screen elements thereon for removing solid animal matter from sewage contained in a semi-cylindrical tank in a tannery is shown in U.S. Pat. No. 1,769,655. The chain conveyor rides on a drum having a cylindrical surface formed of a screen so that all the liquid passes into the drum and is filtered by the screen prior to removal of the liquid from the tank. The screen elements project downwardly from the conveyor to sweep solids from the space between the drum and the bottom curved surface of the semi-cylindrical tank. The reference system does not suggest a coke oven decanter drag assembly having screen elements, nor such an assembly having solid spindles as distinguished from the screen surface of the drum as shown in the reference.

U.S. Pat. No. 3,891,558 shows a conveyor with arc-shaped buckets of screen material for allowing liquid to drain from solid material as it is conveyed in the buckets on the conveyor. This reference does not suggest the use of conveyor apparatus having screen elements in a highly viscous material such as tar contained in a flushing liquor decanter. Nor does the reference suggest a drag assembly in a coke oven decanter having planar screen elements as distinguished from the arc-shaped screens shown.

SUMMARY OF THE INVENTION

The invention is of an improvement in a continuous drag assembly in a decanter for separating tar from coke oven flushing liquor. The continuous drag assembly includes a plurality of spaced rotary spindles having a solid outer cylindrical surface, endless travel means mounted on said rotary spindles and means for driving said endless travel means. The continuous drag assembly is mounted in the decanter so that the endless travel means passes through a portion of the tar therein. The improvement of this invention comprises at least one screen member mounted on said endless travel means. The screen member is a planar metal plate having plurality of holes in a screen portion thereof. Preferably, the screen portion has a height in a direction normal to the axis of said rotary spindles within the range of 4 inches to 12 inches and a plurality of holes, the cross sectional dimensions of which are within the range of $\frac{1}{4}$ inch to 1 $\frac{1}{4}$ inches.

Surprisingly, a continuous drag assembly having screens as just described for passing through a portion of the tar removes sufficient floating agglomerates to permit uniform outflow of the tar from the decanter. A particular advantage of the invention is that tar quality is enhanced by virtue of more uniform and lower moisture and QI levels. Also, partial or total plugging of the weir in the decanter for controlling outflow of tar from the decanter is prevented. These features are accomplished without an increase in drag failures, the occurrence of which require months to repair and clean a decanter.

BRIEF DESCRIPTION OF THE DRAWINGS

FIG. 1 is a partial cut-away side elevation view of a coke oven flushing liquor decanter.

FIG. 3 is a plan view of the spindles 27, 29 and 31 and the sprockets of the continuous drag assembly in the decanter of FIG. 1.

DESCRIPTION OF THE PREFERRED EMBODIMENT

Figure 5:
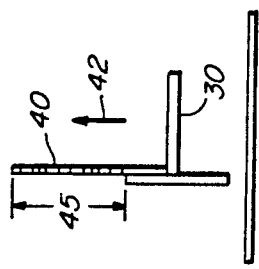
FIG. 5 is a section taken at V—V of FIG. 4.
Figure 4:
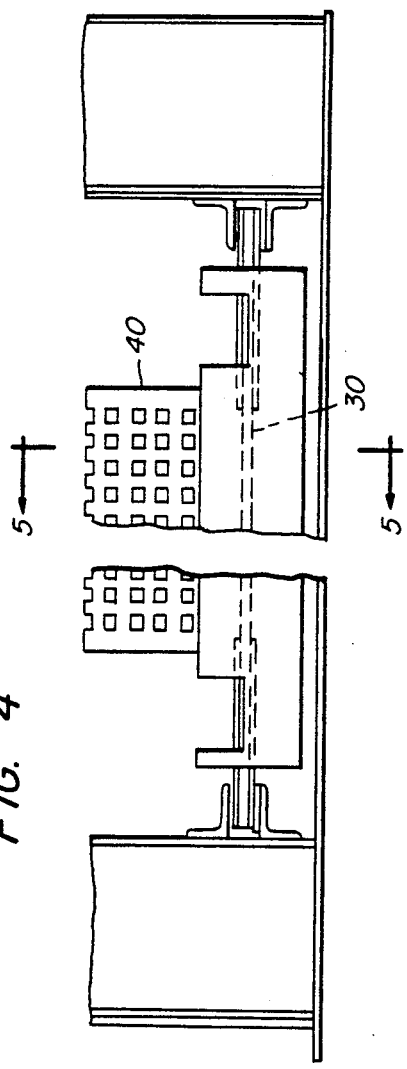
FIG. 4 is a section taken at IV—IV of FIG. 2.
Figure 2:
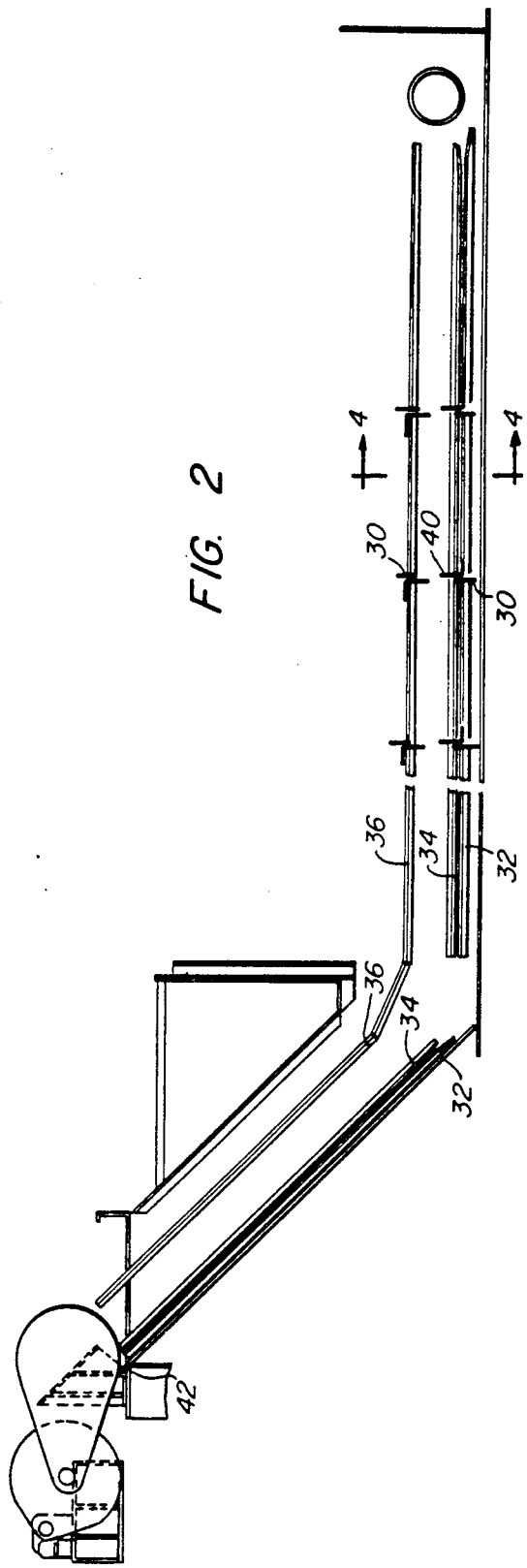
FIG. 2 is a side view of guide rails 32, 34 and 36 of the continuous drag assembly in the decanter of FIG. 1.

Referring to FIG. 1 a decanter 10 is shown for separating tar from flushing liquor in coke plants. The decanter is usually a generally rectangular container having an inlet 12 for receiving a flushing liquor containing tar in suspension from the coke plant. The decanter has a sloped bottom 14 at one end thereof. In the course of flow through the decanter tar settles to the bottom and the lighter flushing liquor floats on top of the tar effecting a separation by gravity. Flushing liquor is removed from the decanter via an exit pipe (not shown). A weir 18 is provided in the form of a pipe extending downwardly into the tar in the decanter. An inner pipe (not shown) concentrically mounted within the weir extends downwardly to a level above the lower end of the Weir. Means (not shown) is provided for withdrawing tar upwardly through the inner pipe to remove the tar from the decanter.

A drag assembly is provided for removing large coal and coke particles from the bottom of the container. The drag assembly includes a plurality of endless chains 20 at spaced locations along the bottom of the decanter. The position of the various chains is indicated at centerlines 52 of FIG. 3. The endless chains are mounted on a plurality of sprockets located at each of positions 22, 24 and 26 adjacent to the decanter bottom. The sprockets are journalled on spindles 25, 27 and 29. For the purposes of the claims "spindles" are defined as cylindrical members having a solid outer cylindrical surface. A conventional drive assembly 28 is provided for rotating the spindles to cause movement of the endless chains on the sprockets. The drive assembly includes motors 31, gear reducers 33, countershaft 35, and gears 37, 39, 41 and 43.

A plurality of "drag bars" 30 are mounted at spaced locations on the endless chains. Centerlines 50 of FIG. 3 indicate the spacing of the drag bars mounted on chains at locations 52 of the drag assembly. The drag bars ride on guide rails 32, 34 and 36 made of angle iron affixed to the decanter.

According to this invention, at least one screen member 40 is provided on the endless travel means of the drag assembly. The screen member comprises a planar metal plate having a plurality of holes in a screen portion 45 thereof. The screen portion has a height in direction 42 sufficient to remove floating particles of coal or coal agglomerated with tar and moisture from within the tar. Preferably, screen portion 45 has a height within the range of 4 to 12 inches. More preferably, this dimension is within the range of 6 to 10 inches.

The holes in the screen portion of the planar metal plate have cross sectional dimensions within the range of ¼ inch to 1 ¼ inches. Most preferably the holes have cross sectional dimensions within the range of ½ inch to 1 ¼ inches. We use square ¾ inch holes because they are easier to make in the heavy plate used for the screen member. We have found that generally agglomerated particles of ¾ inch diameter or larger are the ones which cause plugging of the weir. Smaller particles usually are not a problem. The screen member may be integral with each drag bar 30 or welded or bolted to the drag bar. We have found that use of the screen members in combination with what we call T-shaped drag bars is most efficient for preventing drag bar failures. The term "T-shaped" refers to the transverse cross sectional shape of the drag bars best illustrated in FIG. 5.

Drag bar failure is a very serious problem, since several months of work may be required to cleaning and repairing of decanter in which such failures has occurred. In and of themselves, the T-shaped drag bars are not new. However, the use of screen members with the T-shaped drag bars is the most preferred from of the invention.

Finally, in order to minimize drag bar failure, we use screens on only about one-third of the drag bars in the drag assembly. Normally, the drag assembly will have 24 drag bars. We use screens on only about 8 of the drag bars. Preferably, the ratio of the number of screens per foot of total length of the interior of the decanter from 42 to 44 (FIG. 1) is within the range of 0.05 to 0.60, more preferably within the range of 0.10 to 0.30. Preferably, the screen members extend inwardly from the location of their attachment to the endless travel means toward the spindles. This permits the drag bars to remove solids from the bottom surface of the decanter and the screen members to remove floating agglomerates from within the tar above the bottom of the decanter.

What is claimed is:

1. An apparatus for separating tar from coke oven flushing liquor, said apparatus comprising:
   an elongated generally rectangular decanter, means for controlling the rate of flow of tar exiting the decanter,
   a continuous drag assembly, said continuous drag assembly having a plurality of spaced spindles with solid outer cylindrical surfaces,
   endless travel means mounted on the spindles, means for driving the endless travel means and a plurality of members mounted on the endless travel means at spaced locations for removing solids from the decanter, said member mounted on the endless travel means including a drag bar having a T-shaped cross section normal to the length thereof, the crossbar of the T-shaped drag bar being aligned in a direction normal to the axis of the spindles, at least one of said T-shaped drag bars having a screen member in the form of a substantially planar metal plate, said metal plate projecting from the cross bar of the T-shaped drag bar toward a plane through axes of adjacent spindles in the decanter, said metal plate having a plurality of holes in a screen portion therein, said screen member serving to remove floating agglomerates of coal and coke from the tar in the decanter and permit uniform outflow of tar exiting the decanter.

2. The improved apparatus of claim 1 in which the height of the screen portion of the metal plate in a direction normal to the axis of the spindles is within the range of 4 inches to 12 inches, and the cross sectional dimensions of the holes in said screen portion are within the range of ¼ inch to 1 ¼ inches.

3. The improved apparatus of claim 1 wherein height of the screen portion of the metal plate having said plurality of holes therein is within the range of 6 to 10 inches.

4. The improved apparatus of claim 1 wherein the holes in the metal plate of said screen member have cross sectional dimensions within the range of ½ inch to 1 ¼ inch.

5. The improved apparatus of claim 1 wherein the ratio of the number of screen members on said endless travel means per foot of total length of the interior of the decanter is within the range of 0.05 to 0.60.

6. The improved apparatus of claim 1 wherein said screen member is attached at opposed corresponding ends thereof to said endless travel means and extends inwardly from said endless travel means toward the spindles of said drag assembly.

* * * * *